UNITED STATES PATENT OFFICE.

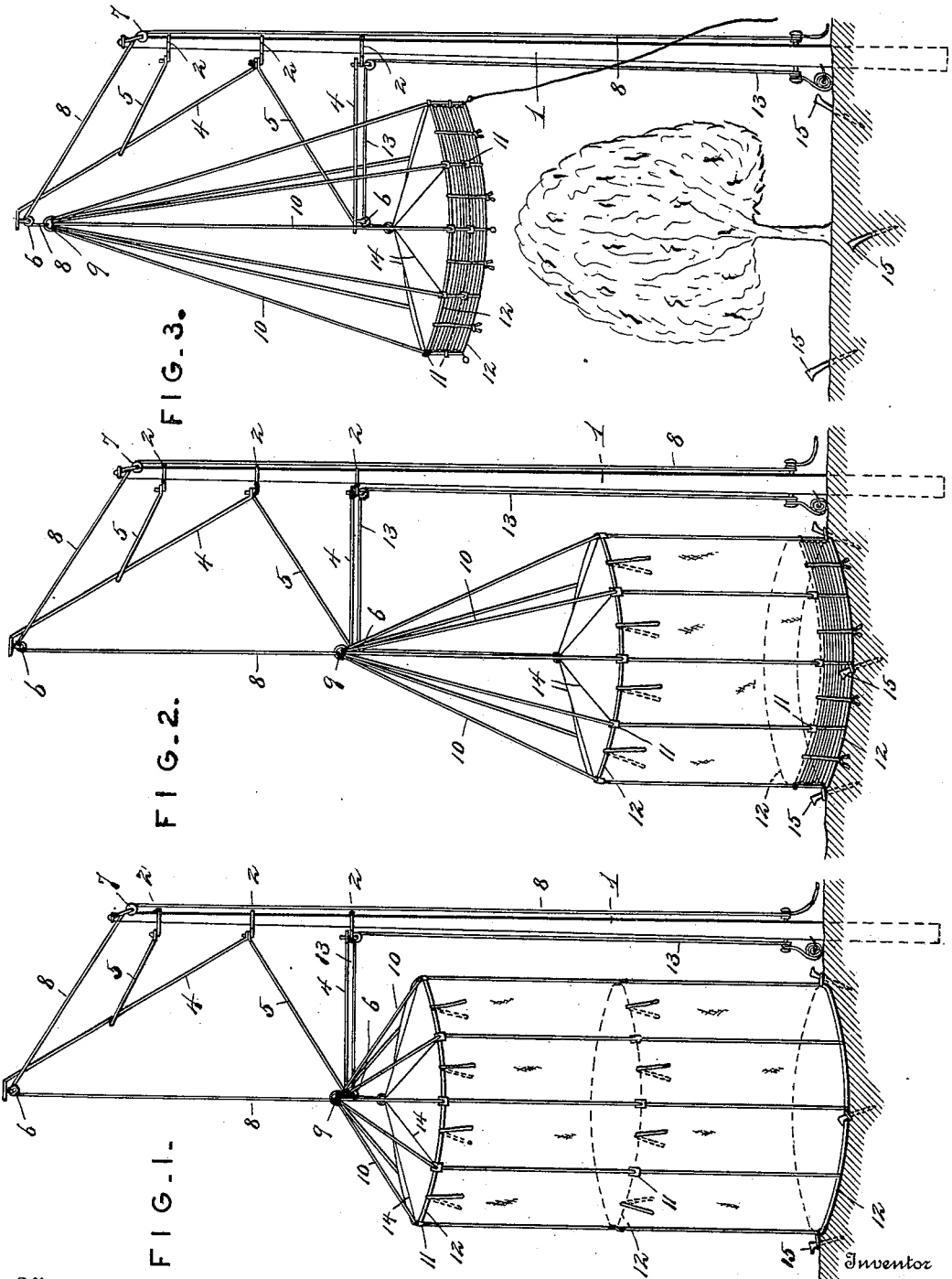

JOSEPH A. CONRAD, OF DE LAND, FLORIDA.

TREE OR SHRUB PROTECTOR.

SPECIFICATION forming part of Letters Patent No. 645,890, dated March 20, 1900.

Application filed July 6, 1899. Serial No. 722,948. (No model.)

*To all whom it may concern:*

Be it known that I, JOSEPH A. CONRAD, a citizen of the United States, residing at De Land, in the county of Volusia and State of Florida, have invented a certain new and useful Tree or Shrub Protector, of which the following is a specification, reference being had therein to the accompanying drawings.

This invention relates to tree and shrub protectors.

The object of the invention is to provide a tent or cover for trees and shrubs to protect them from freezing and from inclement weather generally, as well as for inclosing them for spraying and fumigating purposes.

The invention consists in combinations hereinafter described and claimed.

In the drawings, Figure 1 is an elevation showing my improved tree and shrub protector full spread for enveloping and protecting a tree. Fig. 2 is also an elevation showing the same as reeved for inclosing a shorter or lower tree or shrub. Fig. 3 is an elevation showing the tent drawn together and in position to be let down over a tree or to be drawn to one side for allowing rain to fall upon the tree or for the removal and detachment of the tent from the hoisting-rope.

1 is a post or mast suitably set in the ground at a distance from the tree or plant to be protected, and to this mast is attached, through mast-rings 2 2 2, a bracket consisting of supporting-arms 4 4 and braces 5 5. The supporting-arms extend about over the center of the tree and carry at their outer extremities sheaves or pulleys 6 6. Leading over the top pulley 6 and over a pulley 7 at the top of the mast is a halyard 8, connected through the medium of an eye or hook 9 with wall-elevating cords 10 10, which pass through eyes 11 at the top and midway to the bottom of the tent. The tent itself consists of a body of canvas or other suitable fabric stretched upon or around hoops or rings 12 12 12. The top or upper end of the tent is suspended from the lower pulley 6 through the medium of a halyard 13, connected with the center of the top of the tent. The top of the tent is reinforced or strengthened by radial cords or ropes 14, and the halyard 13 is connected with an eye or gromet formed in the center of the top of the tent.

When the tent is in position, the bottom will be held firmly in place by means of tent-pins 15 15, as shown in the drawings.

In operation, the tent being suspended, as shown in Fig. 3, the operator gives way on halyard 8 and the walls of the tent fall by gravity over and around the tree or shrub, as shown in Fig. 1.

If the tent is to cover a short or low shrub, both the halyards 8 and 13 are given out, so as to let the top and walls of the tent drop into the position shown in Fig. 2.

Having described my invention, what I claim as new, and desire to secure by Letters Patent, is—

A tree-protector involving the combination of a suitable mast or pole, a bracket having two supporting-arms connected with the pole one above another, a pulley or sheave in the extremity of each of the arms, a collapsible or foldable tent, a plurality of distending-hoops attached to the walls of the tent, a halyard connected with the top of the tent and leading around the sheave in extremity of the lower arm of the bracket for bodily raising and lowering the tent and for holding it in an elevated position, elevating-cords attached to the lower hoop, and a second halyard extending over sheave in the upper arm of the bracket for independently raising and lowering the lower end of the tent, substantially as described.

In testimony whereof I affix my signature in presence of two witnesses.

JOSEPH A. CONRAD.

Witnesses:
S. B. WILSON,
J. D. WILSON.